(12) United States Patent
Alexander

(10) Patent No.: US 10,955,987 B2
(45) Date of Patent: Mar. 23, 2021

(54) THREE-DIMENSIONAL USER INTERFACE

(71) Applicant: Facebook, Inc., Menlo Park, CA (US)

(72) Inventor: Alexandros Alexander, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 48 days.

(21) Appl. No.: 15/284,934

(22) Filed: Oct. 4, 2016

(65) Prior Publication Data

US 2018/0095633 A1 Apr. 5, 2018

(51) Int. Cl.
*G06F 3/0481* (2013.01)
*G06F 3/01* (2006.01)

(52) U.S. Cl.
CPC .......... *G06F 3/04815* (2013.01); *G06F 3/012* (2013.01); *G06F 3/017* (2013.01)

(58) Field of Classification Search
CPC .... G06F 3/048; G06F 3/04815; G06F 3/0482; G06F 3/0485; G06F 3/04817; G06F 3/04883; G06F 3/017; G06F 3/012
See application file for complete search history.

(56) References Cited

U.S. PATENT DOCUMENTS

| | | | | | |
|---|---|---|---|---|---|
| 5,880,733 | A | * | 3/1999 | Horvitz | G06F 3/04815 715/850 |
| 6,002,403 | A | * | 12/1999 | Sugiyama | G06F 3/04815 715/717 |
| 7,278,115 | B1 | * | 10/2007 | Conway | G06F 3/04815 345/418 |
| 8,907,943 | B2 | * | 12/2014 | Piemonte | G06F 3/0346 345/419 |
| 9,392,212 | B1 | * | 7/2016 | Ross | H04N 5/9305 |
| 2008/0070684 | A1 | * | 3/2008 | Haigh-Hutchinson | A63F 13/5375 463/32 |
| 2008/0307360 | A1 | * | 12/2008 | Chaudhri | G06F 9/451 715/835 |
| 2009/0106671 | A1 | * | 4/2009 | Olson | G06F 16/487 715/757 |
| 2010/0100853 | A1 | * | 4/2010 | Ciudad | G06F 3/012 715/856 |
| 2011/0131502 | A1 | * | 6/2011 | Ryu | G06F 3/017 715/744 |

(Continued)

OTHER PUBLICATIONS

Valve Corporation, "Envelop for Windows (Public Beta)," Sep. 30, 2016 [retrieved from https://web.archive.org/web/20160930144236/http://store.steampowered.com/app/372650/ on Jan. 4, 2017].

*Primary Examiner* — Tuyetlien T Tran
(74) *Attorney, Agent, or Firm* — Sheppard Mullin Richter & Hampton LLP

(57) ABSTRACT

Systems, methods, and non-transitory computer-readable media can present a first view of a three-dimensional user interface to a user, the first view representing a first portion of a three-dimensional space of the three-dimensional user interface. A first user input is received to modify the first view. The first view is modified based on the first user input to present a second view of the three-dimensional user interface, the second view representing a second portion of the three-dimensional space different from the first portion. The first portion comprises a first application window, and the second portion does not include the first application window.

20 Claims, 10 Drawing Sheets

(56) References Cited

U.S. PATENT DOCUMENTS

| | | | | |
|---|---|---|---|---|
| 2012/0151416 A1* | 6/2012 | Bell | .................... | G02B 27/2228 |
| | | | | 715/848 |
| 2013/0055103 A1* | 2/2013 | Choi | ....................... | G06F 3/017 |
| | | | | 715/740 |
| 2013/0106674 A1* | 5/2013 | Wheeler | .............. | G02B 27/017 |
| | | | | 345/8 |
| 2014/0002582 A1* | 1/2014 | Bear | ....................... | H04N 5/445 |
| | | | | 348/14.08 |
| 2014/0068504 A1* | 3/2014 | Sun | ....................... | G06F 3/0481 |
| | | | | 715/794 |
| 2014/0210705 A1* | 7/2014 | Kim | ...................... | G06F 3/0485 |
| | | | | 345/156 |
| 2014/0337749 A1* | 11/2014 | Phang | ................. | G06F 3/04815 |
| | | | | 715/740 |
| 2015/0077416 A1* | 3/2015 | Villmer | ................ | G02B 27/017 |
| | | | | 345/419 |
| 2015/0116316 A1* | 4/2015 | Fitzgerald | .............. | G02B 27/01 |
| | | | | 345/419 |
| 2016/0180762 A1* | 6/2016 | Bathiche | .................. | G09G 3/20 |
| | | | | 345/174 |
| 2017/0262049 A1* | 9/2017 | Kim | ........................ | G06F 3/012 |

\* cited by examiner

THREE-DIMENSIONAL USER INTERFACE

FIELD OF THE INVENTION

The present technology relates to the field of user interfaces. More particularly, the present technology relates to a three-dimensional user interface.

BACKGROUND

Today, people often utilize computing devices (or systems) for a wide variety of purposes. Users can use their computing devices, for example, to interact with one another, create content, share content, and view content. In some cases, a user interface can be provided for a user to interact with various content on a computing device. For example, a user interface can allow a user to interact with various applications and/or files on the computing device. The user interface can also provide an organizational structure for a user to locate files and/or applications intuitively and with minimal difficulty.

One type of user interface commonly utilized in computing devices is a windows-driven user interface. A windows-driven user interface can, for example, be implemented on a two-dimensional display device, and provide one or more two-dimensional windows laid over a two-dimensional background, or desktop. Each window can be associated with a particular application. For example, a user can have a window open for a word processing application, a window open for a spreadsheet application, a window open for a web browser application, and a window open for an operating system application or file storage application. These various windows provide an organizational structure for a user to navigate between various applications.

SUMMARY

Various embodiments of the present disclosure can include systems, methods, and non-transitory computer readable media configured to present a first view of a three-dimensional user interface to a user, the first view representing a first portion of a three-dimensional space of the three-dimensional user interface. A first user input is received to modify the first view. The first view is modified based on the first user input to present a second view of the three-dimensional user interface, the second view representing a second portion of the three-dimensional space different from the first portion. The first portion comprises a first application window, and the second portion does not include the first application window.

In an embodiment, the first user input to modify the first view comprises user head orientation information.

In an embodiment, the user head orientation information is received via a headset worn by the user.

In an embodiment, the first and second views of the three-dimensional user interface are presented via the headset worn by the user.

In an embodiment, a second user input is received to reposition the first application window within the three-dimensional user interface. The first application window is repositioned from the first portion of the three-dimensional space to the second portion of the three dimensional space based on the second user input.

In an embodiment, the second user input comprises a gesture made by the user.

In an embodiment, the gesture is captured using a camera.

In an embodiment, the gesture is captured by a wearable device worn by the user.

In an embodiment, the repositioning the application window comprises positioning the first application window at an angle between vertical and horizontal.

In an embodiment, the three-dimensional user interface allows a user to rotate the user's view in three-hundred sixty degrees in any direction.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
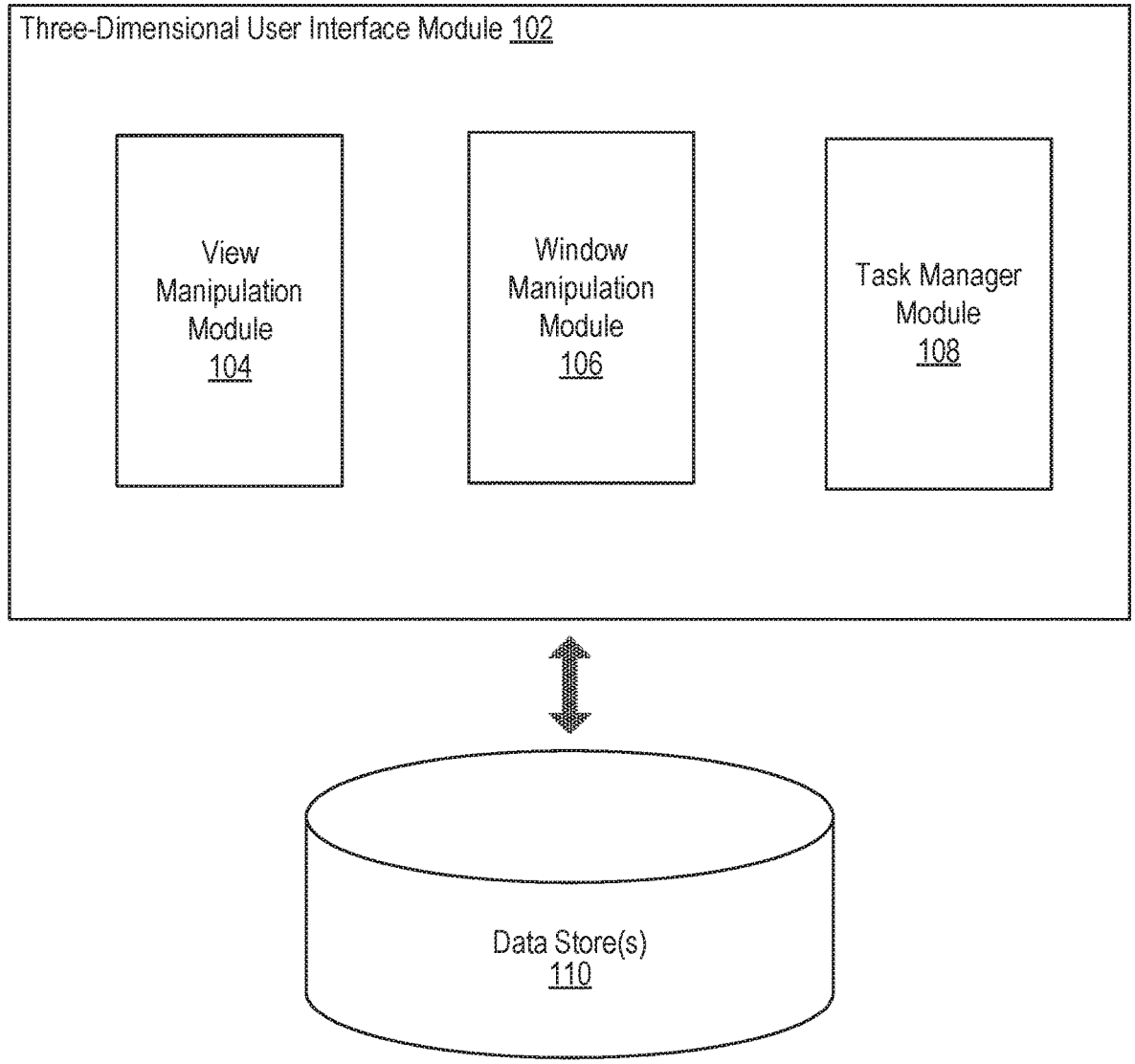
FIG. 1 illustrates an example system including a three-dimensional user interface module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Three-Dimensional User Interfaces

Today, people often utilize computing devices (or systems) for a wide variety of purposes. Users can use their computing devices, for example, to interact with one another, create content, share content, and view content. In some cases, a user interface can be provided for a user to interact with various content on a computing device. For example, a user interface can allow a user to interact with various applications and/or files on the computing device. The user interface can also provide an organizational structure for a user to locate files and/or applications intuitively and with minimal difficulty.

One type of user interface commonly utilized in computing devices is a windows-driven user interface. A windows-driven user interface can, for example, be implemented on a two-dimensional display device, and provide one or more two-dimensional windows laid over a two-dimensional background, or desktop. Each window can be associated with a particular application. For example, a user can have a window open for a word processing application, a window open for a spreadsheet application, a window open for a web browser application, and a window open for an operating system application or file storage application. These various windows provide an organizational structure for a user to navigate between various applications.

Changes in computing technology often require accompanying changes in user interface design. For example, windows-driven user interfaces developed largely as a result of keyboards and mice becoming the primary means of user input on a computing device. Later on, the development and rise of touch-screen mobile devices led to mobile user interfaces that allow a user to pinch to zoom or swipe to change views. With the development of three-dimensional, virtual reality computing environments, new user interfaces are needed to take advantage of the new tools available to users via these new computing devices.

It continues to be an important interest for developers of computing technologies to improve user experience as users interact with new computing devices. Quality user interfaces allow users to take advantage of capabilities offered by computing devices in an intuitive manner. However, when new computing technologies are developed, they are generally accompanied by new capabilities. Almost by definition, users are unfamiliar with these new capabilities, and it can be difficult to determine what is the best way for users to interact with new computing technologies. As such, it can be a challenge to implement new user interfaces that users find intuitive and easy to use, especially when the new user interfaces are designed be used with new computing technologies that users are unfamiliar with. In the example of three-dimensional, or virtual reality computing environments, it is a significant challenge to get users accustomed to three dimensional computing environments, when users are accustomed to two-dimensional environments, such as the two-dimensional windows-driven user interfaces used in many operating systems today.

An improved approach rooted in computer technology overcomes the foregoing and other disadvantages associated with conventional approaches specifically arising in the realm of computer technology. Based on computer technology, the disclosed technology can provide a three-dimensional user interface. In certain embodiments, the three-dimensional user interface can be a three-dimensional windows-driven user interface. For example, a user may be presented with a "current view," that represents only a portion of a three-dimensional computing environment. As a user changes his or her perspective, for example, by moving a cursor, or by moving his or her head and/or eyes while wearing a virtual reality headset, the current view within the three-dimensional environment can change. For example, a user can turn his or her head to the left or to the right to and the current view presented to the user can rotate to the left or the right in the three-dimensional computing environment. The user can be provided with the ability to place windows anywhere within the three-dimensional computing environment. As such, rather than having a single, two-dimensional window user interface, a user can be provided a three-dimensional user interface in which windows can be placed anywhere within the three-dimensional computing environment, e.g., to the left, to the right, in front of, behind, above, and/or below the user's current view. These concepts will be described in greater detail below with reference to the figures.

FIG. 1 illustrates an example system 100 including an example three-dimensional user interface module 102 configured to provide a three-dimensional user interface, according to an embodiment of the present disclosure. As briefly described above, the three-dimensional user interface can be a windows-driven user interface for allowing a user to interact with various files and/or applications on one or more computing devices. In certain embodiments, the three-dimensional user interface can include a three-dimensional computing environment. The three-dimensional computing environment can act as a "background" or environment within which a user can place various application windows. In two-dimensional user interfaces, this computing environment is often known as a "desktop," and application windows are arranged on top of the two-dimensional desktop. However, in the three-dimensional user interface disclosed herein, the three-dimensional computing environment can be a three-dimensional and application windows can be placed anywhere within the three-dimensional computing environment. In certain embodiments, the three-dimensional computing environment can allow a user to rotate his or her view 360 degrees in any direction. In other words, the three-dimensional computing environment completely surrounds the user. For example, the three-dimensional computing environment can be implemented as a virtual "room," with four walls, a floor, and a ceiling, and application windows can be placed anywhere within the room. The three-dimensional computing environment can include various background elements to assist in organizing a user's view. For example, in the virtual "room" example, the room can include a desk and a shelf, so that the user can place certain application windows on or near the desk, and can place certain application windows on or near the shelf. These background elements can act as anchor points or points of reference for a user so that the user has some reference as to what portion of the three-dimensional user interface the user is currently viewing. A user can be provided with various user input devices to navigate the three-dimensional user interface and to manipulate application windows or other elements within the three-dimensional user interface. For example, a headset can be provided to allow a user to change his or her current view within the three-dimensional user interface (e.g., by the user turning his or her head), and a keyboard and mouse or other user input device can be used to manipulate application windows.

As shown in the example of FIG. 1, the three-dimensional user interface module 102 can include a view manipulation module 104, a window manipulation module 106, and a task manager module 108. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details.

The view manipulation module 104 can be configured to receive user input to change a user's view within a three-dimensional user interface, or three-dimensional computing environment. At any given time, a user may be presented with a current view representing a portion of the three-dimensional computing environment. The user can be provided with a user input device to change views, i.e., to move within the three-dimensional computing environment. For example, the user can be provided with a headset that is able to determine changes in the user's head position and/or orientation. As the view manipulation module 104 receives user head orientation information indicative of changes in the user's head orientation, the view presented to the user can change accordingly. For example, as the user rotates his head to the left, the view can rotate to the left, or as the user looks up, the view can rotate upwards. As the view is rotated based on the user's movements, the user is presented with a different portion of the three-dimensional computing environment. In certain embodiments, the headset, or a separate pair of viewing glasses or goggles can be used to present the user interface to the user.

In certain embodiments, in addition to head orientation information, the view manipulation module 104 can be configured to receive eye tracking information that tracks the movement of a user's eyes. A user's eye movements can be used to change the current view, and/or to move a cursor within the current view. For example, if a current view has four application windows, the user can move his or her eyes between the four application windows to move a cursor between the four application windows. When a user is looking at a particular application window, such that the cursor resides on that particular application window, the application window can be considered to be "in focus" such that the user can interact with that application window. For example, the user can look at a particular application window, and then scroll a scroll-wheel to scroll the window, or type information into the window. If the user moves the cursor to another application window, e.g., by moving his or her eyes to look at the other application window, then the other application window becomes the window in focus such that the user can now interact with that application window. In certain embodiments, rather than using eye tracking information to move a cursor, another input device can be used, such as a mouse, trackpad, or trackball. In various embodiments, different input devices can be used in tandem with one another.

The window manipulation module 106 can be configured to receive user input to manipulate one or more application windows within a three-dimensional user interface. As discussed above, one or more application windows can be opened within a three-dimensional user interface. In certain embodiments, a given application window can be curved or straight based on user preference. Curved application windows can provide a more three-dimensional effect, e.g., the effect of a window "wrapping around" a user. However, users may prefer straight application windows for visual clarity. For each application window, a user may be given an option to toggle between a curved presentation or a straight presentation. Users can "manipulate" application windows by taking various actions with respect to the application windows. For example, users can open new application windows, close application windows, minimize application windows, maximize application windows to fill the entire current view, interact with information within an application window (e.g., scrolling through a web browser, or entering text into a word processing application window), or resize, reorder, and/or reposition application windows.

Users can be provided with one or more user input devices to manipulate and interact with application windows. For example, users can use a keyboard and mouse to enter various commands, e.g., scrolling, typing, or moving a cursor. In certain embodiments, users can use gestures to take certain actions. For example, users can wear wearable devices on their hands, or a camera can capture user hand gestures, so that the user can "grab" windows with their hands to reposition them, or grab the edges of windows and pull out or push in to resize windows, or use their hands to swipe between or within windows (e.g., swiping or down can scroll up or down through a web browser), or users can "tap" on a window to click on a particular button or command.

The task manager module 108 can be configured to manage various aspects of the three-dimensional user interface. For example, the task manage module 108 can be configured to provide a user with a task bar, or start menu, from which the user can select an application to open a new application window. In certain embodiments, the task bar may be located within a particular area within the three-dimensional user interface. For example, in the example of a three-dimensional room user interface, the task bar may be located within a particular area of the room. In another embodiment, a user can perform a particular gesture to open up the task bar. For example, if the user looks straight up, the task bar may open, or if the user performs a gesture similar to looking at a watch on the user's wrist, the task bar may appear on the user's arm.

The task manager module 108 can also be configured to automatically manage various aspects of application window presentation. For example, when a new application window is opened, the task manager module 108 can be configured to determine an open space within the user's current view to open the new application window. In another example, the task manager module 108 can be configured to automatically organize all currently open application windows, e.g., by resizing them and fitting them all in the current view or "tiling" the windows. In another example, the task manager module 108 can be configured to allow only a certain number of application windows to be open at any given time, e.g., a maximum number of application windows. When a new application window is opened such that the maximum number of application windows is exceeded, the task manager module 108 can automatically close an application window based on application window ranking criteria. For example, the task manager module 108 can be configured to close the application window that is least active, or close the application window that has been opened for the longest time, etc. The task manager module 108 can also be configured to manage computing resources. In certain embodiments, so as to conserve computing resources, if multiple application windows are open, certain application windows can be presented with a decreased refresh rate. For example, a "current" or "in focus" application window can have a refresh rate representative of a maximum or ideal refresh rate, and all other application windows can have a decreased refresh rate that is lower than that of the in focus application window.

In certain embodiments, the task manager module 108 can be configured to implement a personal space feature within the three-dimensional user interface. For example, a three-dimensional user interface can include both a public space and a personal space. In certain embodiments, the public space can be a shared environment that is accessible by multiple users (although not necessarily accessible by all users). However, each user can have a personal, or private space, in which they can keep information that is accessible and visible only to that user. The user can perform a particular gesture to access his or her personal space. For example, the user can look at his or her wrist, as if to check the time, which can open up a personal space icon that can be selected by the user to open his or her personal space. The same icon can be selected to close the personal space. The user can move things from the public space into his or her personal space, or vice versa, such that the user can share things within their personal space with others by moving them into the public space. In certain embodiments, content characteristics (as defined by, for example, metadata associated with a file or application), may determine whether or not a particular content can be moved into or out of a personal space. For example, time information associated with the content, a location associated with the content, any tags associated with the content, comment information associated with the content, and the like, may restrict whether the content can be moved from a user's personal space into a shared/public space, or vice versa. The user can re-arrange or organize his or her personal space, and such organization can be stored in memory, such that the next time the user opens his or her personal space, it will appear as it was when the personal space was last closed.

In certain embodiments, the personal space feature may allow for an "intermediate" level of personal space based on privacy settings of a user. For example, a user may be able to specify privacy settings for one or more content posts such that those content posts are only shared with a particular subset of users in the shared environment. Privacy settings may be defined based on a type of shared environment that the user is currently in, the type of content being shared, user characteristics of individual users or user groups in the shared environment, and the like. For example, a user can specify that if they are in a public shared space (type of shared environment), and the user is posting a photograph (a type of content), only connections of the user on a social networking system are able to view the content post (user characteristics of users in the shared environment).

The three-dimensional user interface module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the three-dimensional user interface module 102 can be implemented, in part or in whole, as software running on one or more computing devices or systems, such as on a server computing system or a user (or client) computing system. For example, the three-dimensional user interface module 102 or at least a portion thereof can be implemented as or within an application (e.g., app), a program, or an applet, etc., running on a user computing device or a client computing system, such as the user device 610 of FIG. 6. In another example, the three-dimensional user interface module 102 or at least a portion thereof can be implemented using one or more computing devices or systems that include one or more servers, such as network servers or cloud servers. In some instances, the three-dimensional user interface module 102 can, in part or in whole, be implemented within or configured to operate in conjunction with a social networking system (or service), such as the social networking system 630 of FIG. 6. It should be understood that there can be many variations or other possibilities.

The three-dimensional user interface module 102 can be configured to communicate and/or operate with the at least one data store 110, as shown in the example system 100. The data store 110 can be configured to store and maintain various types of data. In some implementations, the data store 110 can store information associated with the social networking system (e.g., the social networking system 630 of FIG. 6). The information associated with the social networking system can include data about users, user identifiers, social connections, social interactions, profile information, demographic information, locations, geo-fenced areas, maps, places, events, pages, groups, posts, communications, content, feeds, account settings, privacy settings, a social graph, and various other types of data. In some embodiments, the data store 110 can store information that is utilized by the three-dimensional user interface module 102. For example, the data store 110 can store user interaction information, user preferences, application data, and the like. It is contemplated that there can be many variations or other possibilities.

Figure 2A:
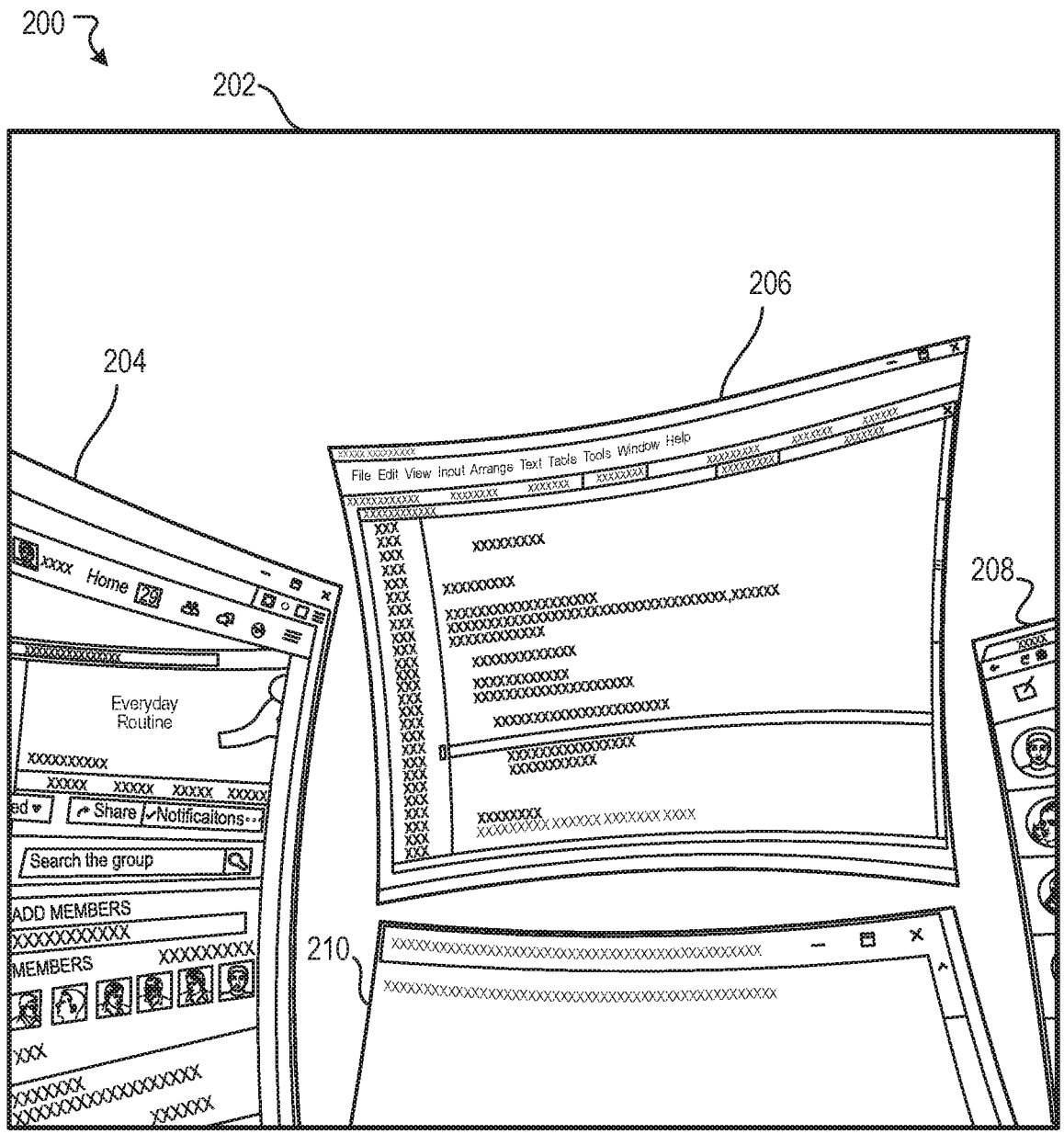
FIGS. 2A-B illustrate an example scenario associated with changing views within a three-dimensional user interface, according to an embodiment of the present disclosure.
Figure 2B:
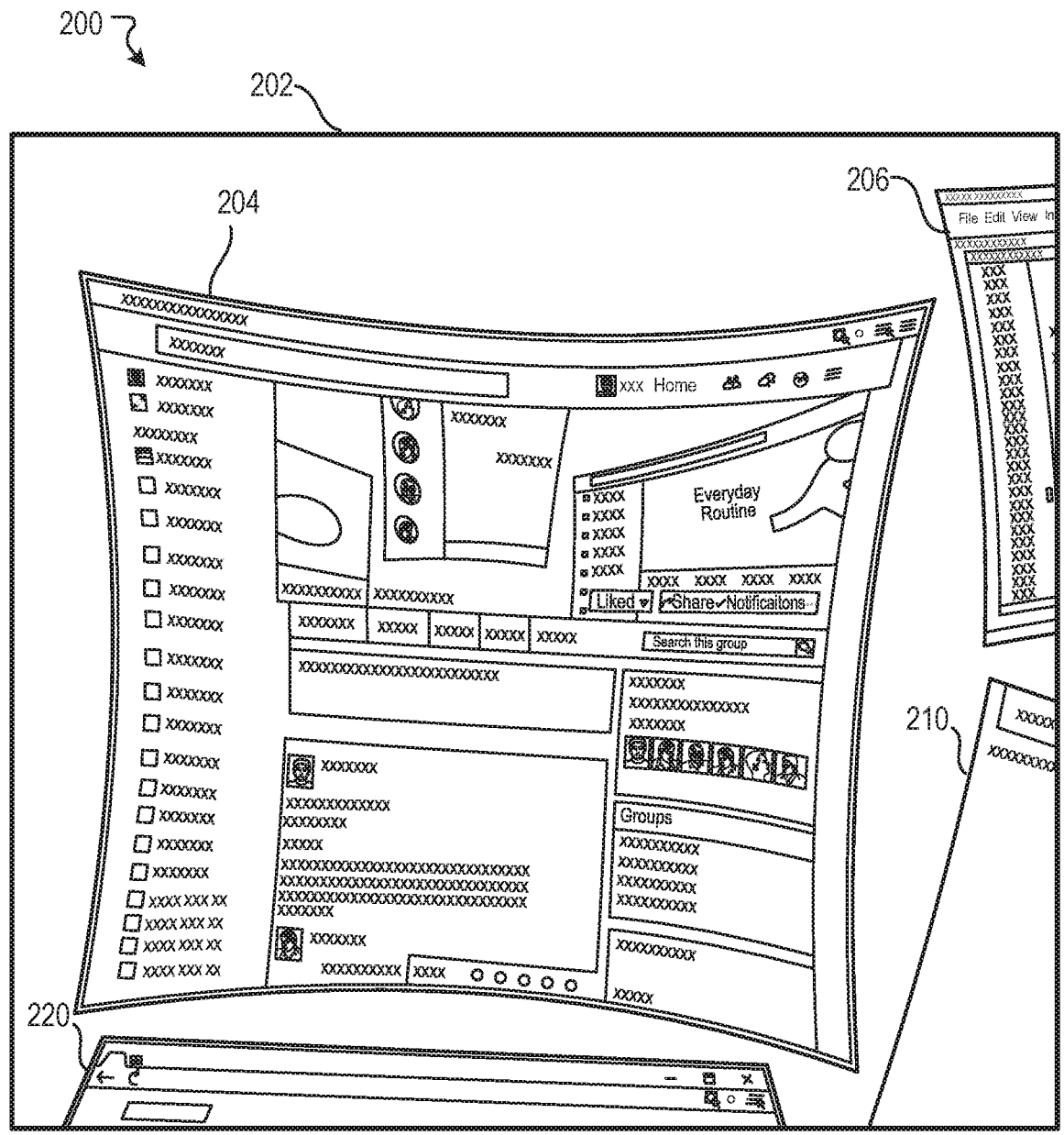

FIGS. 2A-B illustrate an example scenario 200 associated with changing or manipulating a user's view within a three-dimensional user interface. The example scenario 200 includes a user interface 202. In FIG. 2A, the user interface 202 shows a current view in which a user can see four application windows 204, 206, 208, 210. The current view represents a portion of a three-dimensional space defined by the three-dimensional user interface. The user can provide user input to change the user's current view. For example, the user can move his or her head while wearing a headset, or the user can move his or her mouse to the edge of the screen to "push" the view in a particular direction.

In FIG. 2B, the user has moved his view to the left (e.g., by turning his head to the left). By rotating his view to the left, the user is now presented with a different portion of the three-dimensional space of the three-dimensional user interface than the portion that was previously presented to the user. It can be seen that application window 204, which was previously on the left edge of the user's view, has been centered, and application windows 206 and 210, which was previously centered, have moved to the right edge of the user's view. A new, application window 220 has come into view. Application window 220 was previously out of view in FIG. 2A, but has come into view based on the changing of the user's current view.

The user interface 202 can include a cursor so that the user can select one application window to interact with at a given time. The cursor can be a movable cursor that the user can manipulate. For example, the cursor can be moved based on eye tracking information so that the cursor moves based on user eye movement, or the cursor can be moved using a mouse, or trackpad, or similar input device. In certain embodiments, the cursor can be fixed on the center of the screen such that a user selects which application window he or she would like to interact with by centering the application window in the screen.

Figure 3A:
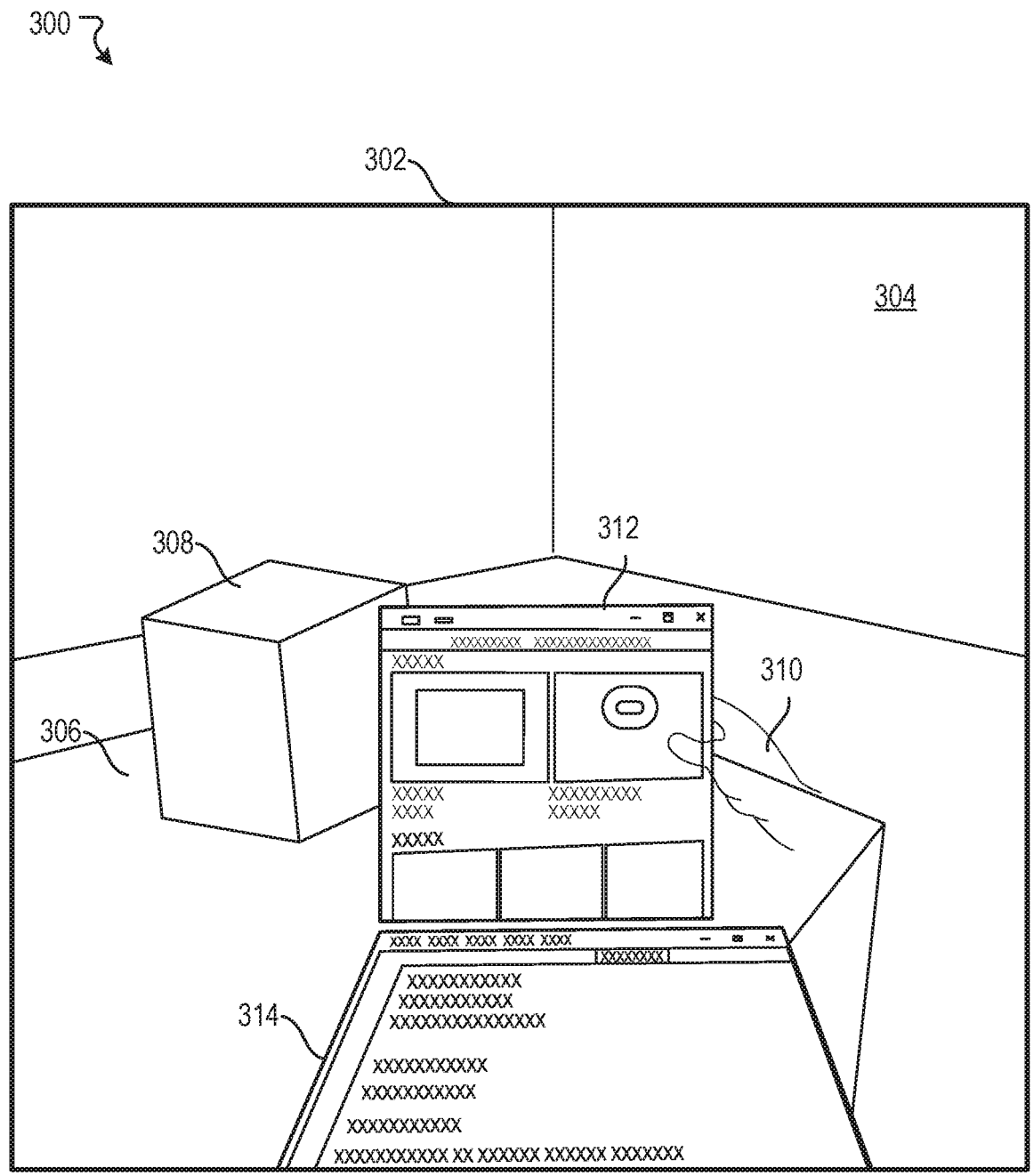
FIGS. 3A-C illustrate an example scenario associated with interacting with a three-dimensional user interface, according to various embodiments of the present disclosure.
Figure 3B:
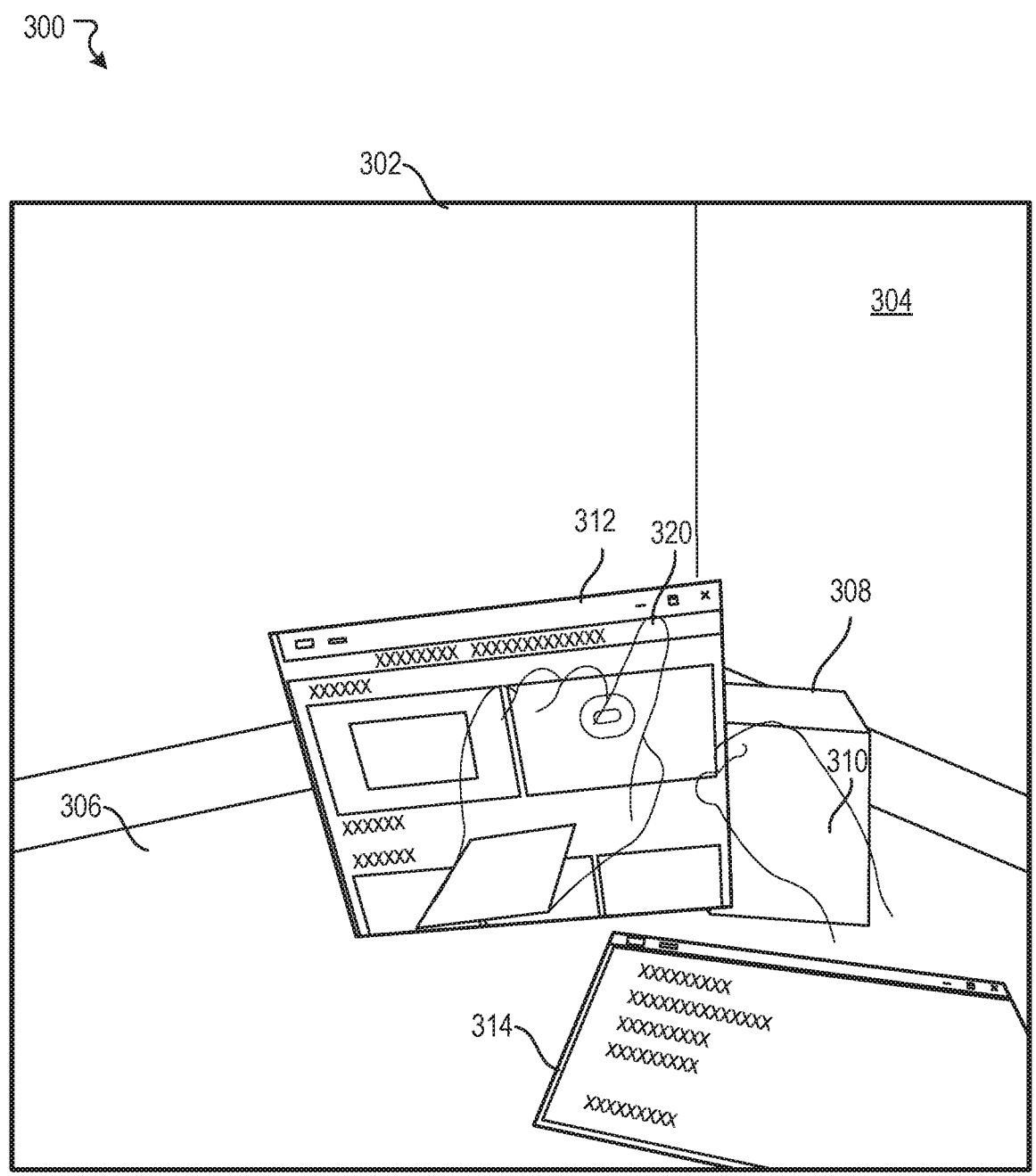
Figure 3C:
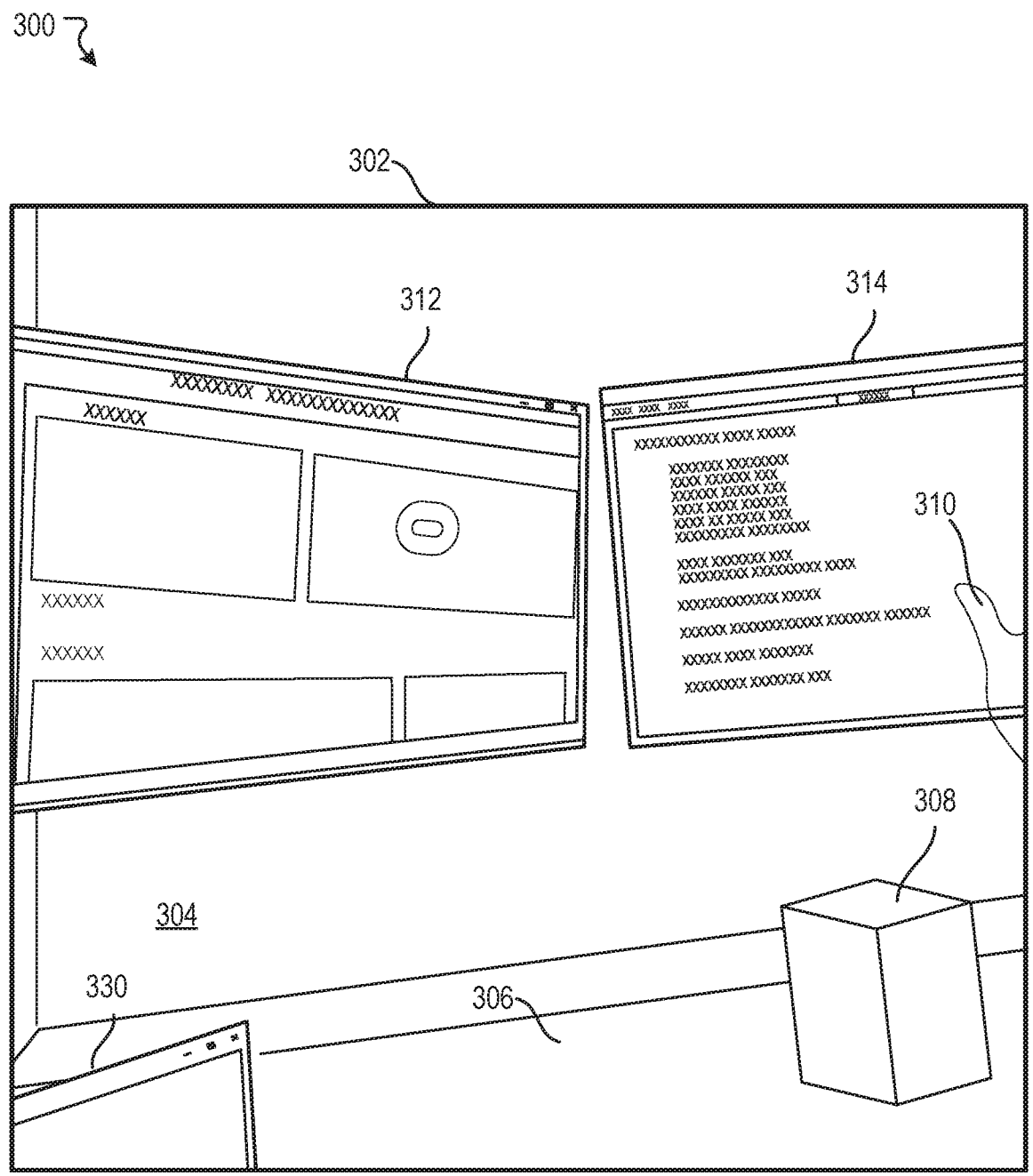

FIGS. 3A-C illustrate an example scenario 300 associated with interacting with a three-dimensional user interface. The example scenario 300 includes a user interface 302. In FIG. 3A, the user interface 302 shows a current view in which a user is looking at two application windows 312, 314, set on a background environment. In the user interface 302, the background environment is a virtual room 304 containing a desk 306 and a decorative block 308. The background environment, i.e., the virtual room 304, desk 306, and decorative block 308, can assist a user by providing anchor points to differentiate between different views within the three-dimensional user interface, and to assist the user in organizing application windows within the three-dimensional space. In certain embodiments, the background environment may include interactive elements. For example, a user may be able to lay application windows flat on the desk 306, or "hang" application windows on the walls of the virtual room 304, or place application windows on top of the block 308, or lean application windows against the block 308, etc.

In FIG. 3A, a user is interacting with the application window 312 via a virtual right hand 310. The virtual right hand 310 can be manipulated by the user via various user inputs. For example, the user could be wearing a wearable device that translates movements of the user's actual hand to movements of the virtual right hand 310. Similarly, a camera can be used to determine movements made by a user's hand to translate the user's movements to the virtual right hand 310. In another example, a user can use a controller, joystick, mouse, and/or touch sensors to control the virtual right hand 310. In FIG. 3A, the user has grabbed the application window 312 to move it and to further interact with it.

In FIG. 3B, the user has moved the application window 312 to the left, and is interacting with the application window 312 using a virtual left hand 320. As was the case with the virtual right hand 310, the virtual left hand 320 can be controlled based on user input. It can also be seen that the user's view has shifted to downward and to the left from FIG. 3A to FIG. 3B. As was described above, for example, with respect to FIGS. 2A-B, the change in view may be effectuated by user input, e.g., by a user moving his head downward and to the left.

In FIG. 3C, the user has taken both application windows 312 and 314 and positioned them to hover above the desk 306. The user may have done this by, for example, grabbing application window 312, and moving it to a new position above the desk 306, and then grabbing application window 314, and moving it to a new position above the desk 306 next to the application window 312. In another embodiment, rather than using physical hand gestures, a user can manipulate application windows by using different input devices, such as a keyboard and mouse (e.g., a user can use the mouse to click and drag application windows from one location to another). It can be seen that the view shown in FIG. 3C has moved upwards from FIG. 3B (and upwards and to the left of FIG. 3A). It should be understood that based on the various functionalities described herein, a user can easily move through a three-dimensional user interface (e.g., based on the user's head position as determined by a headset), and can position application windows and interact with application windows positioned throughout the three dimensional virtual environment (e.g., via hand movements, or by manipulating input devices such as a controller, joystick, keyboard, mouse, etc.). Although the example scenario 300 depicts re-positioning of application windows within the three-dimensional user interface, it should be understood that various other interactions can be implemented. For example, a user can re-size windows by grabbing corners or edges of windows and pulling them out or pushing them in. The three-dimensional nature of the three-dimensional user interface also allows a user to position windows in different orientations, such that application windows need not be vertical, but can be angled backwards or forwards, from anywhere between horizontal to vertical.

Figure 4:
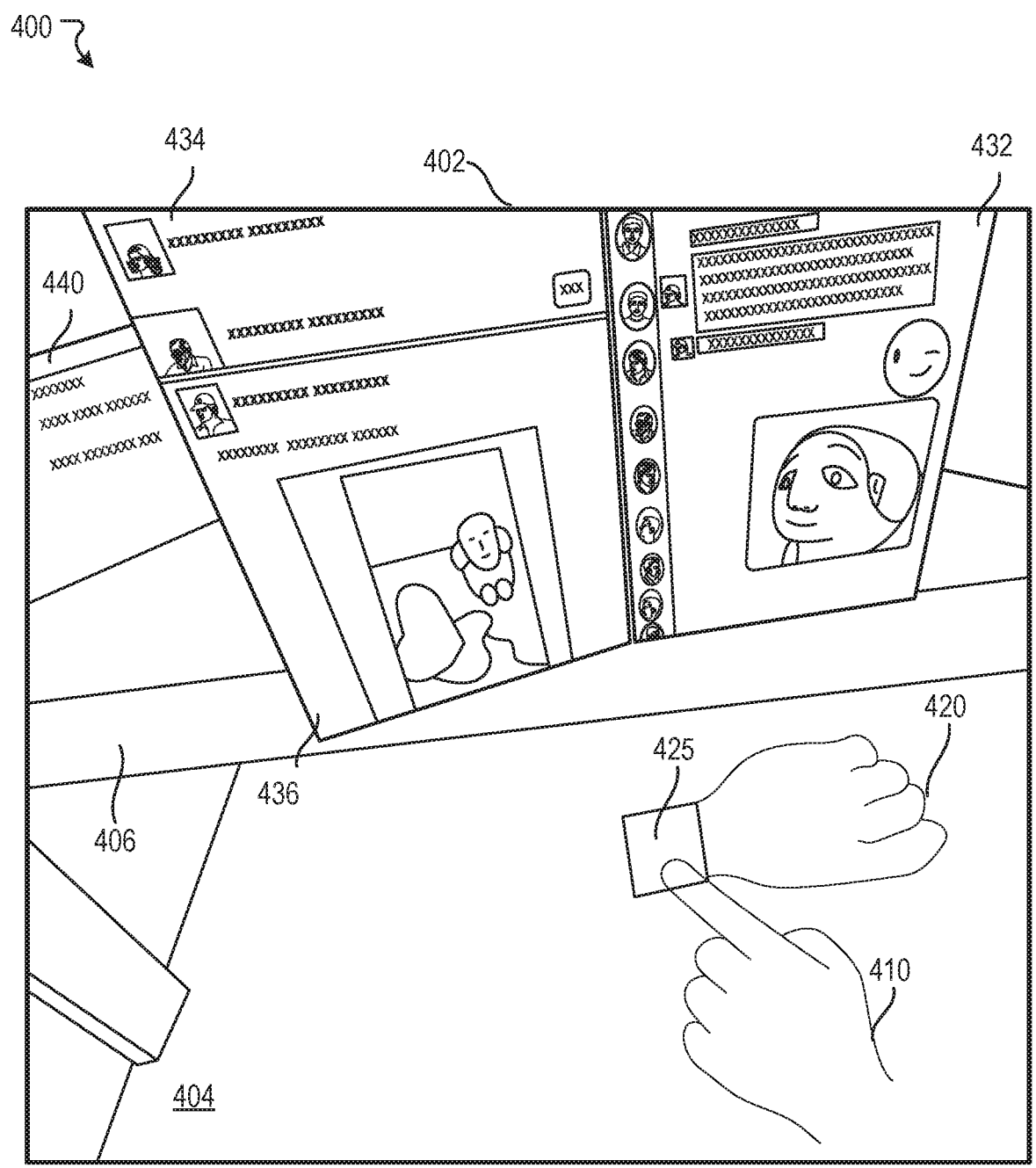
FIG. 4 illustrates an example scenario associated with opening a personal space within a three-dimensional user interface, according to an embodiment of the present disclosure.

FIG. 4 illustrates an example scenario 400 associated with interacting with a personal space within a three-dimensional user interface. In the example scenario 400, a current view 402 shows a virtual right hand 410 and a virtual left hand 420. On the virtual left hand 420, there is a personal space icon 425. By performing the gesture of looking at the user's virtual left wrist, the user can select the personal space icon 425 to open up a personal space. The personal space can include one or more application windows that are viewable only to the current user. In the example scenario 400, the user has selected the personal space icon 425 to open up three application windows 432, 434, 436. These personal space application windows hover in the foreground, while any other application windows remain in the background (such as an application window 440, which is positioned in a virtual room 404 on a virtual desk 406). The background space outside of the user's personal space may be a public space visible to multiple users. The user can add content to the user's personal space. For example, the user could grab the application window 440, currently in the background/public space, and pull it into the personal space. Similarly, the user can move content from the personal space to the public space, e.g., by taking one of the windows 432, 434, 436, and moving them into the background public space. The user can re-arrange or re-organize content within the user's personal space, and the next time the personal space is opened, the content in the personal space will appear as it was left. The user can close or collapse the personal space by tapping the personal space icon 425 again.

Figure 5:
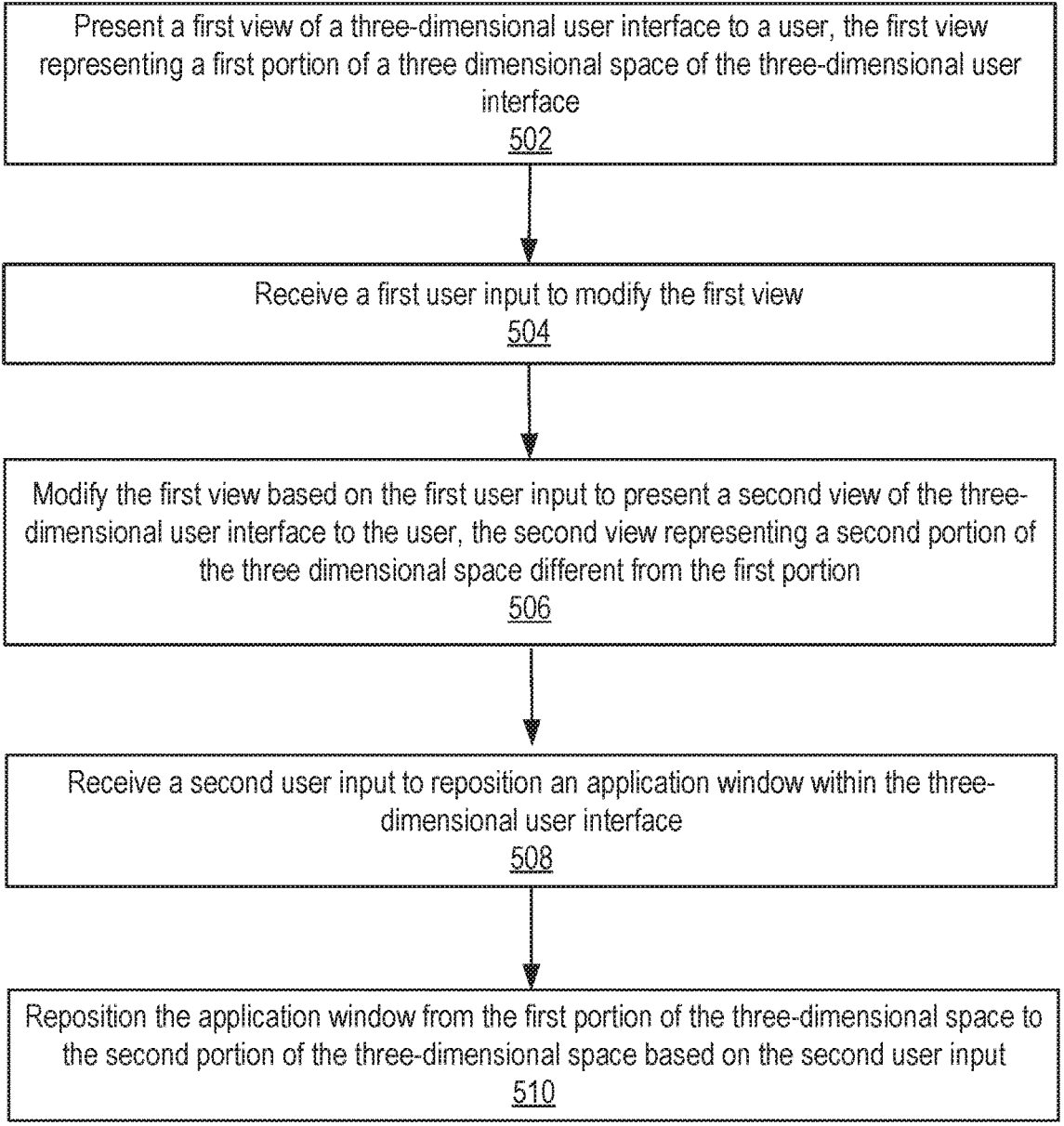
FIG. 5 illustrates an example method associated with interacting with a three-dimensional user interface, according to an embodiment of the present disclosure.

FIG. 5 illustrates an example method 500 associated with interacting with a three-dimensional user interface, according to an embodiment of the present disclosure. It should be appreciated that there can be additional, fewer, or alternative steps performed in similar or alternative orders, or in parallel, based on the various features and embodiments discussed herein unless otherwise stated.

At block 502, the example method 500 can present a first view of a three-dimensional user interface to a user, the first view representing a first portion of a three dimensional space of the three-dimensional user interface. At block 504, the example method 500 can receive a first user input to modify the first view. At block 506, the example method 500 can modify the first view based on the first user input to present a second view of the three-dimensional user interface to the user, the second view representing a second portion of the three dimensional space different from the first portion. At block 508, the example method 500 can receive a second user input to reposition an application window within the three-dimensional user interface. At block 510, the example method 500 can reposition the application window from the first portion of the three-dimensional space to the second portion of the three-dimensional space based on the second user input. Other suitable techniques that incorporate various features and embodiments of the present technology are possible.

Social Networking System—Example Implementation

Figure 6:
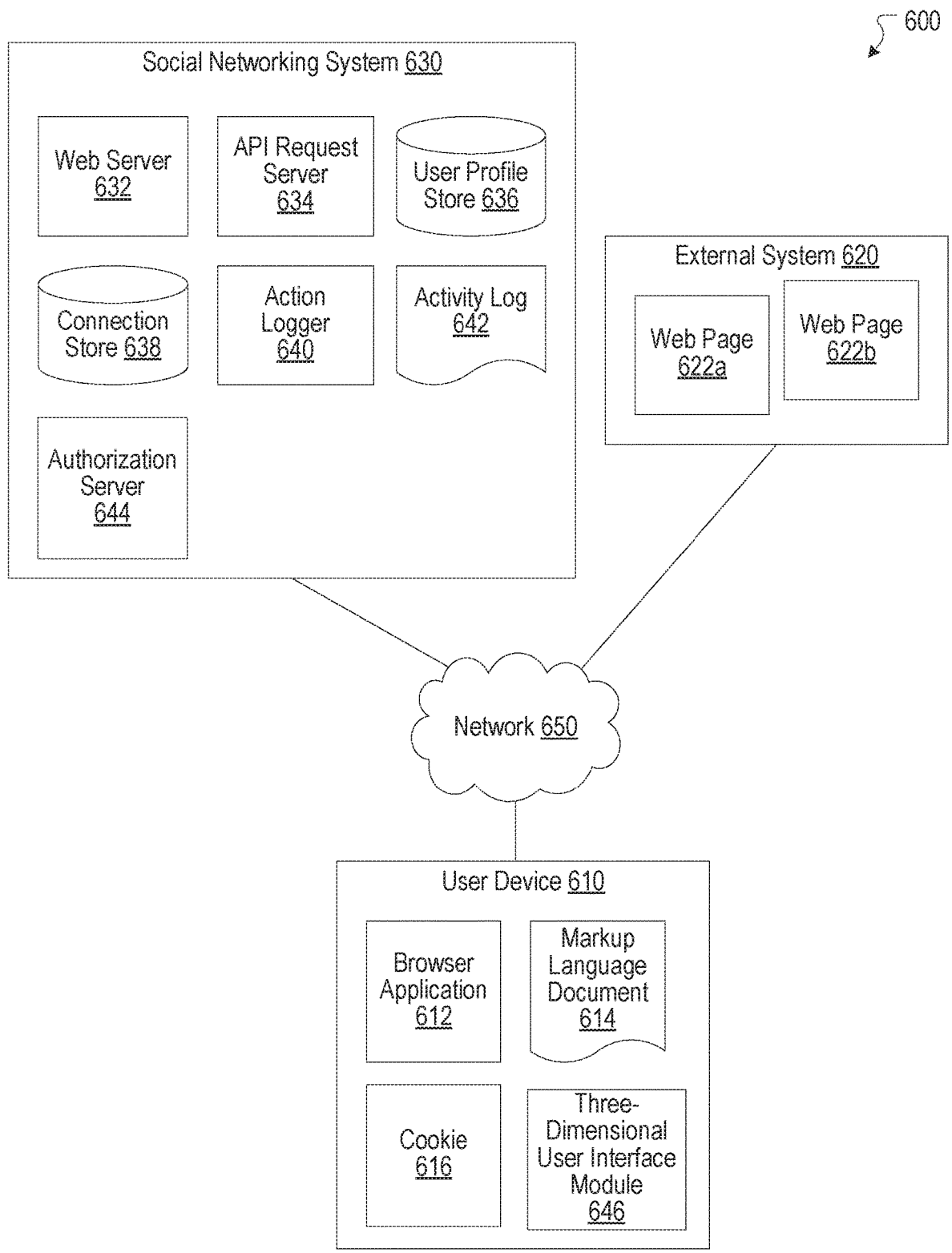
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, according to an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the user device 610 can include a three-dimensional user interface module 646. The three-dimensional user interface module 646 can, for example, be implemented as the three-dimensional user interface module 102, as discussed in more detail herein. As discussed previously, it should be appreciated that there can be many variations or other possibilities. For example, in some embodiments, one or more functionalities of the three-dimensional user interface module 646 can be implemented in the social networking system 630.

Hardware Implementation

Figure 7:
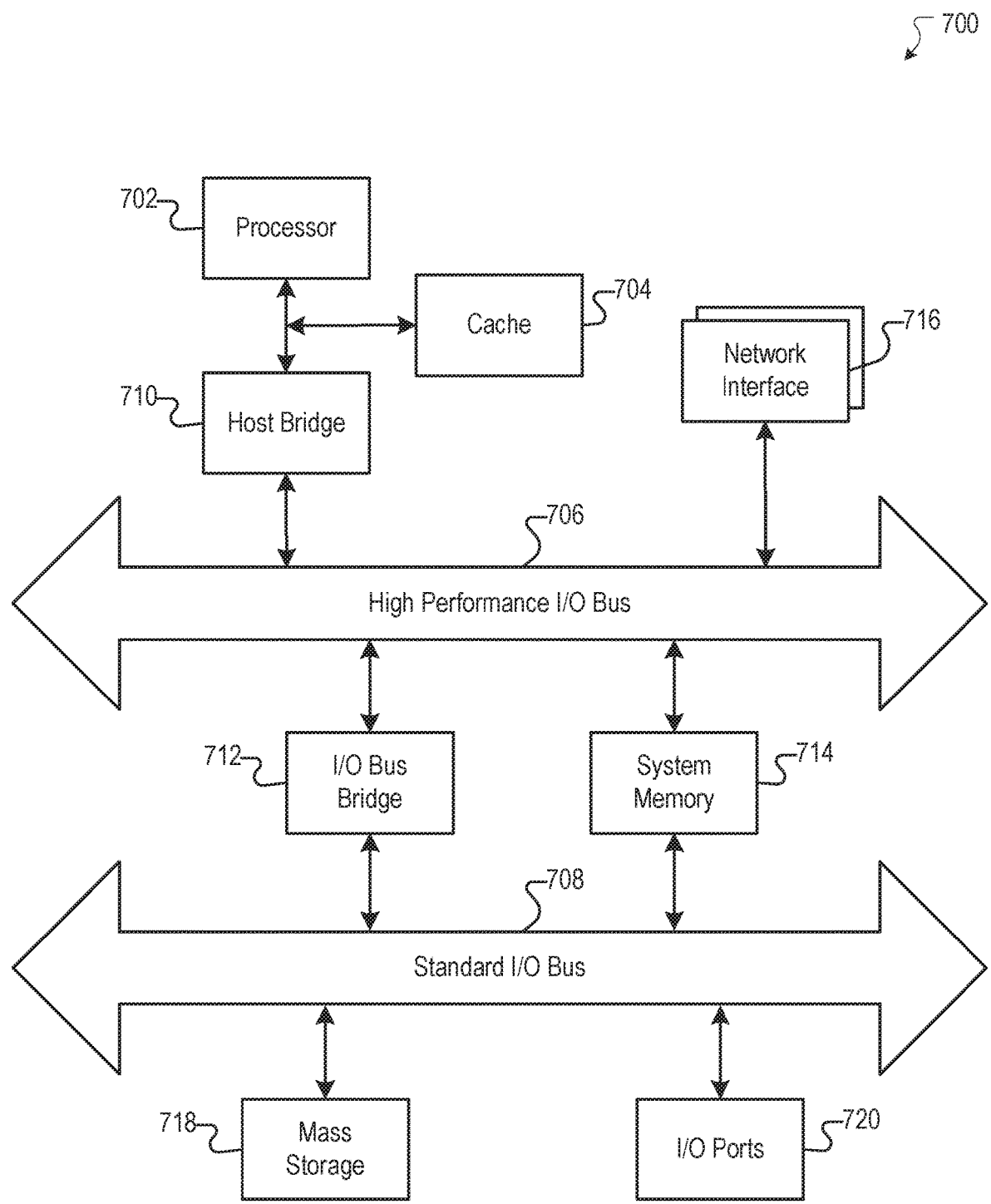
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
presenting, by a computing system, a first view of a three-dimensional user interface to a user, the first view representing a first portion of a three dimensional space of the three-dimensional user interface, wherein the three-dimensional user interface is a virtual reality user interface that completely surrounds the user in 360 degrees in all directions;
receiving, by the computing system, a first user input to modify the first view;
modifying, by the computing system, the first view based at least in part on the first user input to present a second view of the three-dimensional user interface, the second view representing a second portion of the three-dimensional space different from the first portion, wherein the first portion comprises a first application window and the second portion does not include the first application window;
opening, by the computing system, a task bar that allows a second application window to be opened in response to a second user input, wherein the second user input involves a gesture of looking at a virtual wrist associated with the user; and
opening, by the computing system, the second application window in the second portion based at least in part on a determination of an open space in the second portion, wherein the second application window is associated with a higher refresh rate than the first application window based at least in part on a determination that the second application window is in the second view.

2. The computer-implemented method of claim 1, wherein the first user input to modify the first view comprises user head orientation information.

3. The computer-implemented method of claim 2, wherein the user head orientation information is received via a headset worn by the user.

4. The computer-implemented method of claim 3, wherein the first and second views of the three-dimensional user interface are presented via the headset worn by the user.

5. The computer-implemented method of claim 1, further comprising:
receiving a third user input to reposition the first application window within the three-dimensional user interface; and
repositioning the first application window from the first portion of the three-dimensional space to the second portion of the three-dimensional space based on the third user input.

6. The computer-implemented method of claim 1, wherein the task bar appears on a virtual arm associated with the user.

7. The computer-implemented method of claim 1, wherein the gesture is captured using a camera.

8. The computer-implemented method of claim 1, wherein the gesture is captured by a wearable device worn by the user.

9. The computer-implemented method of claim 5, wherein the repositioning the first application window comprises positioning the first application window at an angle between vertical and horizontal.

10. The computer-implemented method of claim 1, wherein
the first user input comprises a 180-degree turn by the user, and
the first portion of the three-dimensional space is positioned directly behind the user while the second portion is presented to the user such that the first application window is also positioned directly behind the user while the second portion is presented to the user.

11. A system comprising:
at least one processor; and
a memory storing instructions that, when executed by the at least one processor, cause the system to perform a method comprising:
presenting a first view of a three-dimensional user interface to a user, the first view representing a first portion of a three dimensional space of the three-dimensional user interface, wherein the three-dimensional user interface is a virtual reality user interface that completely surrounds the user in 360 degrees in all directions;
receiving a first user input to modify the first view;
modifying the first view based at least in part on the first user input to present a second view of the three-dimensional user interface, the second view representing a second portion of the three-dimensional space different from the first portion, wherein the first portion comprises a first application window and the second portion does not include the first application window;
opening, by the computing system, a task bar that allows a second application window to be opened in response to a second user input, wherein the second user input involves a gesture of looking at a virtual wrist associated with the user; and
opening the second application window in the second portion based at least in part on a determination of an open space in the second portion, wherein the second application window is associated with a higher refresh rate than the first application window based at least in part on a determination that the second application window is in the second view.

12. The system of claim 11, wherein the first user input to modify the first view comprises user head orientation information.

13. The system of claim 12, wherein the user head orientation information is received via a headset worn by the user.

14. The system of claim 13, wherein the first and second views of the three-dimensional user interface are presented via the headset worn by the user.

15. The system of claim 14, wherein the method further comprises:
receiving a third user input to reposition the first application window within the three-dimensional user interface; and
repositioning the first application window from the first portion of the three-dimensional space to the second portion of the three-dimensional space based on the third user input.

16. A non-transitory computer-readable storage medium including instructions that, when executed by at least one processor of a computing system, cause the computing system to perform a method comprising:
presenting a first view of a three-dimensional user interface to a user, the first view representing a first portion of a three dimensional space of the three-dimensional user interface, wherein the three-dimensional user interface is a virtual reality user interface that completely surrounds the user in 360 degrees in all directions;
receiving a first user input to modify the first view;
modifying the first view based at least in part on the first user input to present a second view of the three-dimensional user interface, the second view representing a second portion of the three-dimensional space different from the first portion wherein the first portion comprises a first application window and the second portion does not include the first application window;
opening, by the computing system, a task bar that allows a second application window to be opened in response to a second user input, wherein the second user input involves a gesture of looking at a virtual wrist associated with the user; and
opening the second application window in the second portion based at least in part on a determination of an open space in the second portion, wherein the second application window is associated with a higher refresh rate than the first application window based at least in part on a determination that the second application window is in the second view.

17. The non-transitory computer-readable storage medium of claim 16, wherein the first user input to modify the first view comprises user head orientation information.

18. The non-transitory computer-readable storage medium of claim 17, wherein the user head orientation information is received via a headset worn by the user.

19. The non-transitory computer-readable storage medium of claim 18, wherein the first and second views of the three-dimensional user interface are presented via the headset worn by the user.

20. The non-transitory computer-readable storage medium of claim 19, wherein the method further comprises:
   receiving a third user input to reposition the first application window within the three-dimensional user interface; and
   repositioning the first application window from the first portion of the three-dimensional space to the second portion of the three-dimensional space based on the third user input.

* * * * *